Jan. 1, 1952 F. C. REGGIO 2,581,334
ENGINE AIR INDUCTION CONTROL SYSTEM
Filed Sept. 8, 1947 3 Sheets-Sheet 2
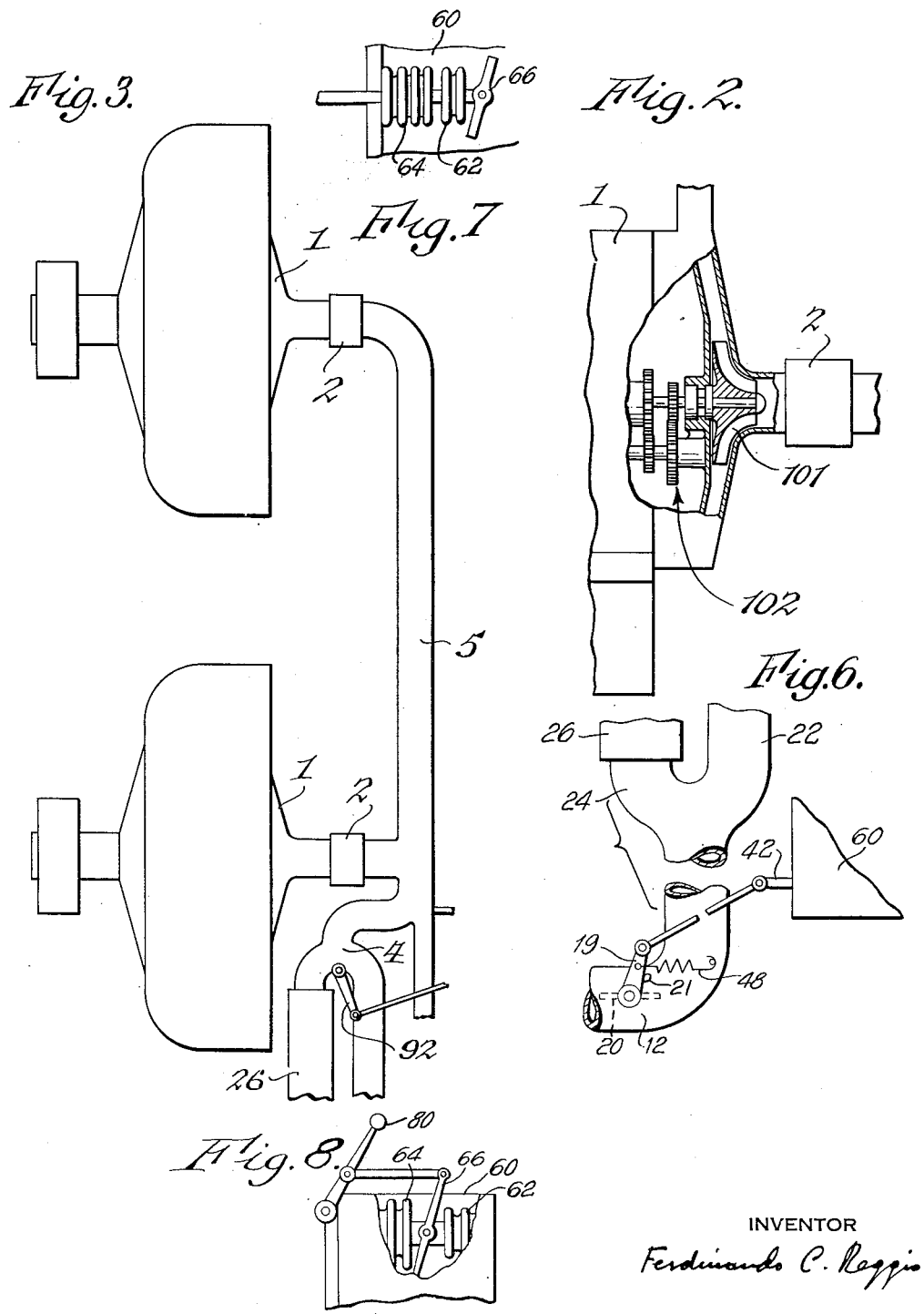
INVENTOR
Ferdinando C. Reggio Patented Jan. 1, 1952

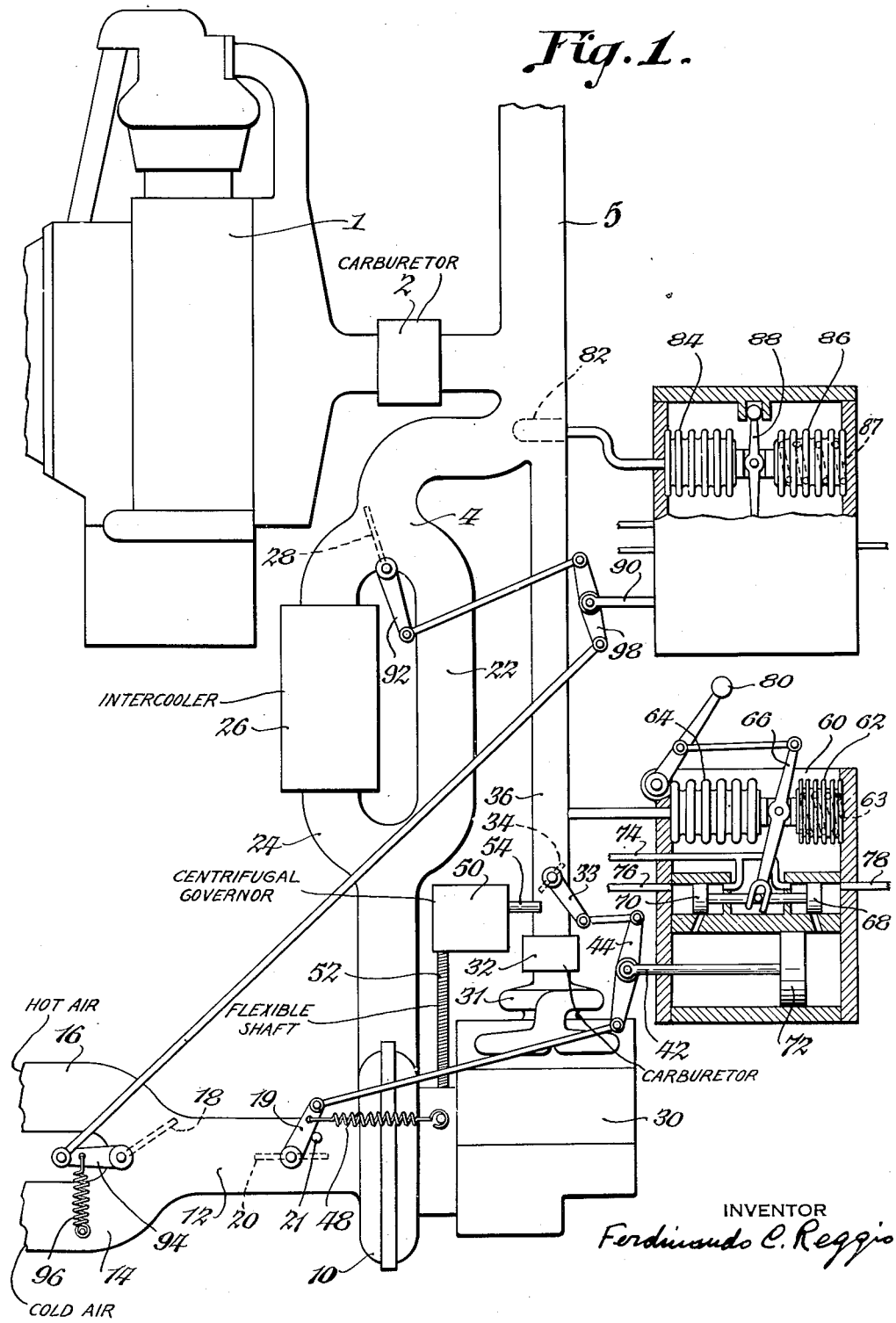

2,581,334

UNITED STATES PATENT OFFICE 2,581,334

ENGINE AIR INDUCTION CONTROL SYSTEM

Ferdinando Carlo Reggio, Norwalk, Conn.

Application September 8, 1947, Serial No. 772,806

53 Claims. (Cl. 123—103)

This invention relates to combustion engines and more particularly to means for regulating the air supply of such engines, the temperature of the induction air or combustible mixture thereof, and means for controlling the operation of superchargers, air compressors, heat exchangers and similar devices connected with the engine induction air system. The invention is particularly useful in connection with aircraft engines which are subject to considerable changes in the surrounding atmospheric pressure and temperature.

The present application is a continuation in part of my application Serial No. 188,960 filed February 5, 1938, (now abandoned), and is a division of my application Serial No. 443,109 filed May 15, 1942, Patent Number 2,516,911, issued August 1, 1950.

One of the objects of the invention is to provide means for efficiently and suitably regulating the pressure, density or temperature of the air or combustible mixture supplied to the engine.

Another object of the invention is to provide a device for automatically controlling the engine manifold pressure or density, or other engine air or combustible mixture induction pressure, in dependence upon the setting of manually operable control means regardless of changes of altitude.

Still another object is to provide means for varying the engine manifold or induction pressure, temperature or density substantially as a preselected function of one or more variables such for example as the setting of manual control means, the surrounding atmospheric pressure or density, the engine exhaust back-pressure.

A still further object is to provide improved means for automatically controlling superchargers, air compressors, auxiliary motors therefor, throttle valves, heat exchangers, alternate air flow conduits or intakes and similar devices connected with the air intake systems of combustion engines.

Further and other objects and advantages will be apparent from the description, in connection with which several embodiments of the invention have been illustrated in the accompanying drawings, in which:

Figure 1 is a diagrammatic view of an engine in connection with a supercharger unit and automatic pressure and temperature regulators therefor.

Figure 2 is a fragmentary longitudinal sectional elevation of a modified construction wherein the engine comprises a second supercharger.

Figure 3 is a diagrammatical partial view of a modified arrangement including two engines.

Figure 6 is a further modification of Figure 1.

Figure 7 is a modification of the pressure responsive bellows assembly.

Figure 8 is a further modification of the pressure responsive bellows assembly of Figure 1.

Figure 5:
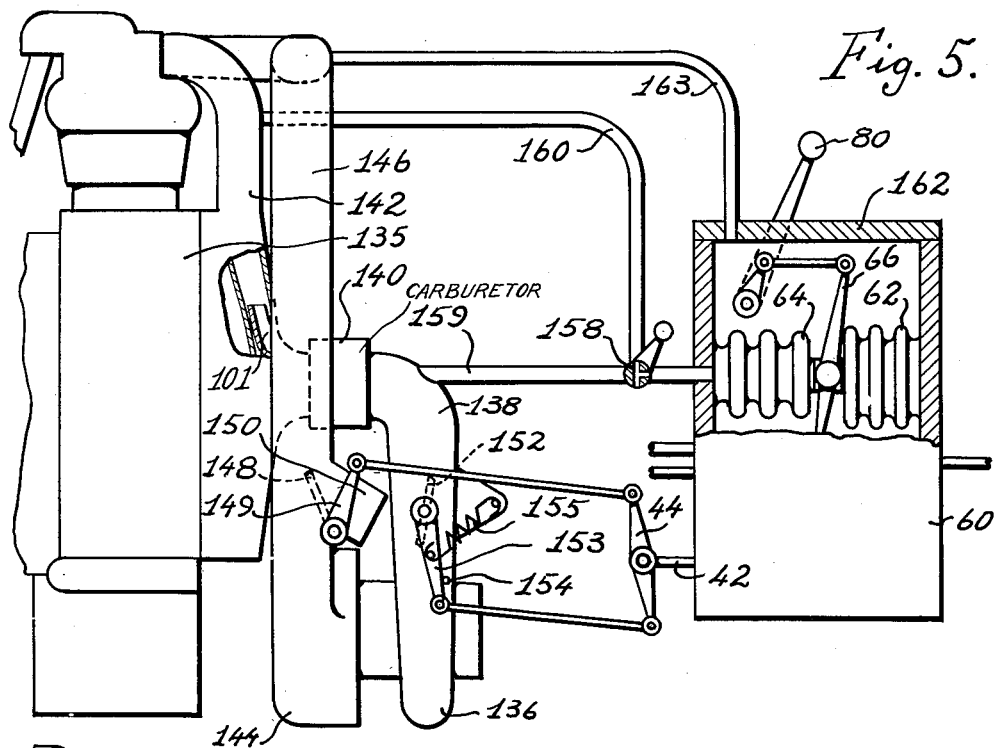
Figure 5 is a diagrammatic view of an automatic regulator in connection with an engine provided with exhaust-driven turbo supercharger.

The power output of conventional carburetor engines and fuel-injection spark-ignition engines is predominantly dependent upon the intake manifold pressure. Such pressure, and in turn the engine power output, are controlled by means of a throttle valve. Aircraft engines provided with superchargers designed for high altitude require, when operating at low altitude or part load, a considerable amount of throttling, whereby an appreciable fraction of the power used to drive the supercharger is wasted, and the temperature of the compressed air may attain objectionably high values.

According to the present invention means may be provided for driving the supercharger at an infinite number of speeds, whereby the supercharger delivery can be adjusted to fit each altitude and operating condition within the designed limits.

The invention is shown as applied to a conventional radial aircraft engine 1 having a carburetor 2 connected through a conduit 4 with a blower 10. Air is supplied to the blower through a conduit 12 having two branches 14 and 16 for leading cold and hot air respectively thereto. A valve 18 is placed at the junction of conduits 14 and 16 and is pivoted so that it may regulate the ratio of cold to hot air admitted to conduit 12 and thereby regulate the resultant temperature of the air in that conduit. A valve 20 is placed in conduit 12 and is adapted to restrict the effective area of that conduit and thereby regulate the pressure at the blower intake.

The conduit 4 has two branches 22 and 24. The latter contains an intercooler, shown generally at 26. A valve 28 is placed at the junction of branches 22 and 24 and is pivoted so that it may regulate the proportion of air flowing through the intercooler and thereby control the temperature in conduit 4. This conduit may extend beyond the engine 1 and form a conduit 5 to supply compressed air to one or more other engines, as shown in Figure 3.

The blower 10 is driven by an independent or self-contained motor. Although any type of variable-speed motor may be used, one among its preterred forms is disclosed in Figure 1 as an internal combustion motor 30 having a carburetor 32 to which air is supplied from conduit 4 through a duct 36 in which is placed a throttle valve 34. A conventional supercharger 31, driven by means of gears by the motor 30, is mounted between the carburetor 32 and the cylinders of the motor.

An idling speed governor, indicated generally at 50, prevents the motor 30 from stalling. In the preferred embodiment it consists of a centrifugal type governor, driven from the motor 30 through the flexible shaft 52, and controlling the position of an axially slidable rod 54 which, in turn, limits the clockwise rotation of lever 33 and thereby prevents the throttle valve 34 from restricting the effective area of duct 36 below the value corresponding, for each value of the pressure in the duct 36, to the idling speed of motor 30.

The governor 50 is so designed that its energy is substantially greater than the energy of a spring 48 one end of which is secured to the lever 19 controlling the valve 20. The spring 48, cooperating with a stop 21, tends to maintain the valve 20 in the open position.

A floating lever 44 is mounted at its median point, by means of a pivot, on an axially slidable rod 42 and its upper and lower ends are connected by means of suitable links with levers 33 and 19 respectively.

In the operation of the above described mechanism the pressure in conduits 36 and 4 is controlled by the axial displacement of the rod 42. Assuming said rod 42 to be initially in its extreme right position, both the valve 20 and the throttle valve 34 will be entirely open, whereby for a given value of the surrounding air density the motor 30 runs at maximum speed, the air pressure in conduit 4 attains its maximum value and the engine 1 develops its maximum power output.

If now the rod 42 is displaced toward the left, while owing to the action of spring 48 the valve 20 remains in the open position, the throttle valve 34 is caused to rotate so as to restrict the effective area of the conduit 36 and thereby reduce the speed of motor 30 and blower 10 and in turn reduce the value of the pressure in conduit 4 and the power output of the engine 1. Continued displacement of the rod 42 in the same direction will cause the speed of motor 30 to be further reduced until the rotation of valve 34 is stopped by the rod 54 operated by the governor 50. The motor 30 will then operate at idling speed, and the pressure in conduit 4 will be practically equal to the surrounding atmospheric pressure. Thereafter, upon continued displacement of the rod 42, the resistance opposed by the governor 50 to further rotation of valve 34 being substantially greater than the resistance opposed by the spring 48 to the rotation of lever 19, while the motor 30 is maintained at idling speed, the floating lever 44 will overcome spring 48 and operate to progressively close the valve 20 and thereby reduce the pressure in conduit 4 to such a low value as may be required for idling speed of engine 1. Obviously, when the rod 42 is displaced in the opposite direction back to its initial position, first the valve 20 will be opened while the motor 30 is idling, and thereafter the speed of the motor 30 will be increased to its maximum value corresponding again to the maximum power output of the engine 1.

In the foregoing the blower 10 has been assumed to be of the centrifugal type. Although the above mentioned type is particularly advantageous in the present system, it is to be understood that the invention is not limited thereto but that various other well known types of blower may be employed. If a blower of the positive displacement type is used, the pressure in the conduit 4 corresponding to idling speed of the engine 1 is obviously obtained for a value of the speed of motor 30 above the idling speed of said motor, the blower inlet being unrestricted, whereby the valve 20 and the floating lever 44 become unnecessary and the rod 42 may be linked directly to the lever 33.

It is to be noted that the engine 1 indicated diagrammatically in Figure 1 may include an additional blower 101 as shown in Figure 2, driven by means of gears 102 from the engine 1 and inserted between the carburetor or charge forming device 2 and the engine cylinders, or connected with the latter in any other suitable manner.

A pressure regulator, indicated generally by numeral 60, is provided to operate the rod 42. The pressure regulator may be any device capable of displacing the rod 42 in response to a change in the pressure inside the duct 36. In the embodiment shown this regulator includes a metallic bellows 62 sealed under total or partial vacuum and provided with a spring 63 adapted to expand said bellows. This bellows acts directly against a similar bellows 64 connected with the duct 36 by a pipe. These two bellows act on a floating lever 66 to operate piston valves 68 and 70 which control the admission of a fluid under pressure to opposite sides of piston 72 which in turn operates the rod 42. The fluid under pressure, usually lubricating oil from an engine driven pump, is led into the pipe 74 and returns to the engine crankcase through conduits 76 and 78. The surrounding atmospheric pressure acts on the two bellows in opposite directions so that any change of pressure in the duct 36 operates the bellows 64 and in turn the piston 72 and returns the pressure in duct 36 to the predetermined value, independently of any variation in atmospheric pressure such as that due to changes of altitude.

A manual control lever 80 adjustable while in flight by the pilot and connected with the upper point of lever 66 is provided, whereby the value of the pressure automatically maintained in duct 36 by the regulator 60 may be controlled. This value of the pressure in ducts 36 and 4 is dependent upon the load of spring 63 mounted within bellows 62, which load is in turn dependent upon the position of control lever 80. In fact, if we assume that the engine 1 operates under steady conditions with lever 80 adjusted in a certain angular position, there corresponds in conduit 4 and within bellows 64 a definite pressure that balances the resilient load of spring 63 plus the eventual resilient loads of bellows 62 and 64 and the pressure within bellows 62 if the latter is not completely evacuated; the pilot valve 68, 70 is in neutral position, and the piston 72 of the servo-motor is stationary. If now the pressure in conduits 4 and 36 and within bellows 64 decreases, owing for example to increasing altitude, bellows 64 contracts, moving the pilot valve 68, 70 toward the left, and causing piston 72 to be displaced toward the right to actuate either throttle valve 34, or throttle valve 20, in a direction to increase the air pressure in conduit 4. Movement of the piston 72 of the servo-motor will continue until the pressure in ducts 4 and 36 and within bellows 64 resumes the initial value corresponding to, or determined by, the position in which control lever 80 is adjusted. Obviously, an increase of pressure in ducts 4 and 36 will set the servo-motor in motion in opposite direction until the pressure therein resumes the initial value determined by the position of control lever 80.

Conversely, when the pilot desires to vary the pressure in conduit 4, for example to increase this pressure, he rotates lever 80 clockwise to a new angular position. This will cause at first clockwise rotation of lever 66 about its middle point and displacement of pilot valve 68, 70 to the left, actuating the servo-motor in a direction to increase the pressure in said conduit and within bellows 64. The latter will then gradually expand, compressing spring 63, rotating lever 66 anticlockwise about its upper end, and displacing pilot valve 68, 70 to the right. Operation of the servo-motor in a direction to increase the supercharging pressure will continue until the pilot valve 68, 70 resumes its neutral position, with the pressure within bellows 64 at a higher value, balancing the increased load of spring 63. In similar manner anticlockwise rotation of control lever 80 to a new angular position will cause the air pressure in conduit 4 to be reduced to and maintained at a correspondingly lower value.

It is therefore apparent that for each given position of control means 80 there will correspond a definite constant value of the pressure in duct 4, or in other words, that the value of the pressure in said duct is determined by the position of the control means 80. This, obviously, is true within certain limits of altitude, as beyond such limits the supercharging pressure controls become at least in part inoperative.

It is to be noted that, for a given position of the manual control 80, the absolute pressure in duct 36 and in conduit 4 will have a constant value within the designed altitude. The power output of engine 1 will increase with the altitude, owing to the corresponding decrease in the exhaust counter-pressure. Instead of a constant absolute pressure in conduit 4, a substantially constant power output of engine 1 at a given speed of the latter may however be obtained with a bellows 62 of smaller displacement than the bellows 64 as shown in Figure 8. In fact, if bellow 62 and 64 have different diameters, the pressure regulator is responsive not only to the absolute pressure in the conduit 4, but also to the surrounding atmospheric pressure, and automatically maintains in conduit 4 an absolute pressure which varies proportionally with changes of the surrounding atmospheric pressure, the ratio of proportionality depending on the ratio of the diameters of said bellows. In particular, with a bellows 62 having a smaller diameter than bellows 64, a reduction of the surrounding atmospheric pressure determines a corresponding decrease of the absolute pressure in conduit 4, and it is clear that it will be possible to establish the relative dimensions of bellows 62 and 64 in such way that a drop in the surrounding pressure, due for example to an increase of altitude, causes a corresponding reduction of supercharging pressure which substantially compensates the effect on the engine power output of the drop of exhaust counterpressure, thus maintaining the power output of the engine, at a given speed thereof, constant or substantially constant independently of changes of altitude.

Therefore, with bellows 64 and 62 of unequal displacements or unequal effective diameters, the pressure in conduit 4 will be dependent upon both the angular setting of control lever 80 and the altitude, or in other words, will be regulated as a preselected function of the surrounding atmospheric pressure and of the position of said control means.

Figure 1, considered in combination with Figure 2, illustrates a powerplant arrangement in which air is supplied to the engine 1 by two superchargers 10 and 101 in series, with an intercooler 26 interposed therebetween, this arrangement being particularly suitable in connection with aircraft powerplants designed for operation at high altitude. When such a powerplant is operating under cruising power at moderate or low altitudes, the blower 10 may become unnecessary, in which case the pressure regulator 60, together with spring 48, will cause the motor 30 to operate at idling speed, with the blower 10 rotating at such low speed as to be substantially ineffective and negligible. Under these conditions the pressure regulator 60 actuates the throttle valve 20 exclusively, angularly adjusting the latter to automatically regulate the air pressure in conduit 4 at a value dependent upon the adjustment of control lever 80 and, where bellows 62 and 64 have unequal diameters, also dependent upon the pressure surrounding these bellows. Obviously, where steady cruising operation at moderate or low altitude is expected, the motor 30, instead of being kept idling, may be stopped. Furthermore, where operation at high altitude is not contemplated, both the motor 30 and the blower 10 may be removed or eliminated from the powerplant, in which case lever 44 may be eliminated and the lever 19 may be linked with the piston rod 42 as shown in Figure 6, the pressure regulator 60 thus being operatively connected with the throttle valve 20 exclusively.

In order to automatically maintain the air temperature in conduit 4 at a predetermined value, a temperature regulator is provided, including a temperature responsive element 82 connected with a bellows 84 acting directly against a similar bellows 86. Bellows 86 is sealed under vacuum and is provided with a spring 87 adapted to expand it against the surrounding pressure. These two bellows act on a lever 88 to operate a servo-mechanism similar to that described for the pressure regulator and which it is considered unnecessary to again describe in detail. Temperature changes in conduit 4 will cause a displacement of rod 90 which in turn operates a floating lever 98 whose upper and lower ends control, by means of levers 92 and 94, the valves 28 and 18 respectively. A spring 96 tends to maintain the valve 18 in the position in which cold air only is admitted to the intake of blower 10.

Assuming the temperature of the air at the blower outlet to be equal to the predetermined temperature to be maintained in conduit 4, the valve 28 will be maintained by the regulator in the position shown in Figure 1, in which position no amount of air flows through the intercooler 26. A decrease in the temperature about the element 82 will cause a displacement toward the right of rod 90 and thereby operate the valve 18 to decrease the proportion of cold air and increase the proportion of hot air admitted to the blower intake. Conversely, an increase in the temperature about the element 82 will cause rotation of valve 18 in the opposite direction and thereby decrease the temperature at the blower intake, until valve 18 reaches its extreme position corresponding to admission of cold air only. Thereafter, further increase in the temperature will cause the valve 28 to be rotated so as to admit the necessary amount of air to the intercooler. Obviously the temperature regulator, if provided with bellows 84 and 86 of equal diameters, is unaffected by changes in atmospheric pressure.

Figure 4:
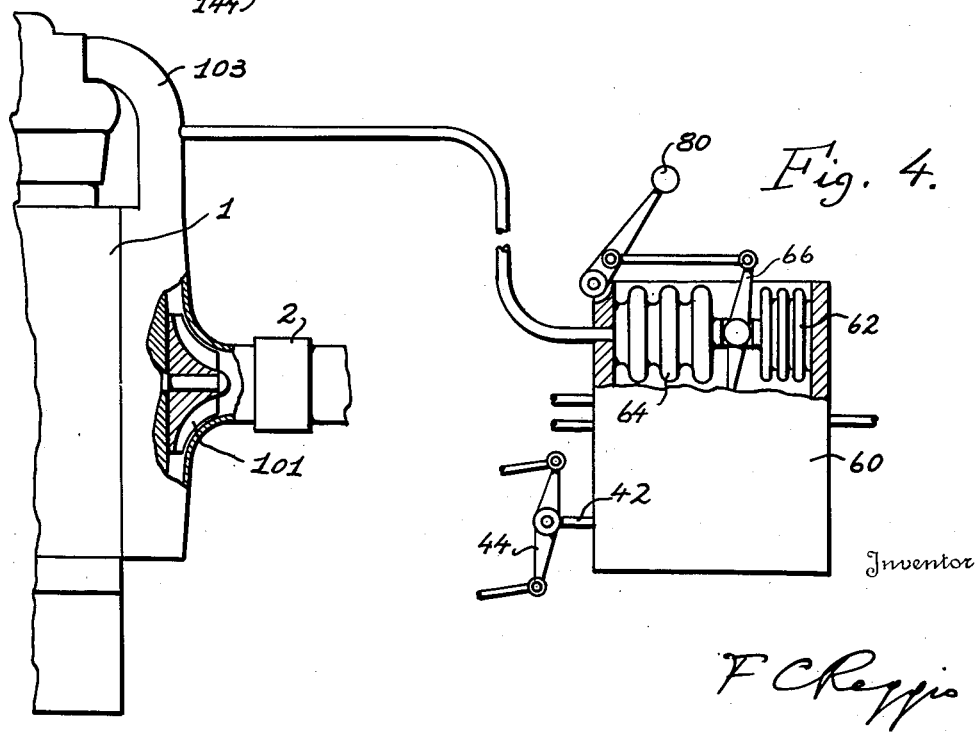
Figure 4 is a modification of Figure 1.

Referring to the arrangement of Figure 1, the regulator 60 controls the pressure in conduit 4 and, if the engine 1 is provided with an additional supercharger, for example a gear-driven conventional supercharger 101 as shown in Figures 2 and 4, then the induction pressure in the engine manifold 103 varies with the engine speed. However, the same pressure regulator 60 may be used to control the pressure at the cylinder inlet ports, independently of the engine speed, by merely disconnecting the bellows 64 thereof from duct 36 and connecting it with the engine manifold 103 as indicated in Figure 4, the remaining structure being as already disclosed in connection with Figure 1.

While in the drawings bellows 62 is shown acting upon lever 66 in opposition to bellows 64, it will be understood that according to the invention bellows 62 may be connected with lever 66 in other ways, for example in such a manner that an expansion of the latter bellows will rotate lever 66 in a direction to decrease the engine manifold pressure, or the engine fuel mixture supply as shown in Figure 7. It is to be understood, moreover, that according to the invention the bellows 62 instead of being completely evacuated may contain a certain amount of gas, in which case the pressure within the bellows will increase with an increase of the surrounding temperature, causing expansion of the bellows. If bellows 62 is so arranged that the temperature thereof is substantially the same as the atmospheric temperature, or a desired engine operating temperature, the pressure regulator 60 will accordingly operate to vary the engine air supply, or fuel mixture supply, or manifold pressure as a predetermined function of the same temperature. Thus the regulator 60 may be so arranged as to automatically vary the engine air or combustible mixture supply or manifold pressure substantially as any desired function of such variables as the setting of control lever 80 and the pressure and temperature to which the bellows or equivalent pressure and temperature responsive means are subject.

In the form of the invention illustrated in Figure 5 the engine 135 is supplied with air or combustible mixture by way of a blower 136 through a duct 138, a carburetor 140 and a manifold 142. The engine 135 may include an additional conventional gear-driven supercharger, inserted for example between carburetor 140 and manifold 142 as indicated by numeral 101. The supercharger 136 is driven at variable speed by an exhaust turbine 144 connected by an exhaust manifold 146 with the cylinder exhaust ports. The flow of exhaust gases to the turbine nozzles is regulated by a valve or blast gate 148 actuated by lever 149. When valve 148 is in its extreme clockwise adjustment all exhaust gases from the engine will be delivered to the turbine, while with valve 148 in its extreme anticlockwise adjustment the exhaust gases discharge through duct 150 and the turbine remains inoperative. At intermediate adjustments of the valve 148 more or less exhaust gases will be supplied to the turbine. It is thus clear that the speed of the supercharger 136 is dependent upon the adjustment of lever 149 just as the speed of the supercharger 10 of Figure 1 is dependent upon the adjustment of lever 33. A throttle valve 152, actuated by a lever 153, may be provided either on the discharge side of supercharger 136, as shown in Figure 5, or on the inlet side thereof. A stop 154 and a spring 155 connected with lever 153 tend to keep the throttle valve 152 in open position.

Levers 149 and 153 are connected with the ends of floating lever 44 of the regulator 60. Bellows 64 of the latter may be connected by means of a three-way cock 158 and ducts 159 and 160 either with duct 138, between the two superchargers, or with the engine manifold 142. The housing of regulator 60, in which bellows 62 and 64 are contained is closed by a cover 162 and the pressure therein is kept equal to the exhaust pressure in manifold 146 by means of duct 163. Bellows 64 and 62 may have unequal diameters. With this arrangement the regulator 60 may be used for selectively controlling the induction pressure in either the first or the second stage of the supercharging system in dependence upon the adjustment of the control lever 80 and the exhaust pressure. In the case of Figure 5, wherein bellows 62 is shown as having larger effective section than bellows 64, for a given setting of control lever 80 if the exhaust pressure decreases the bellows 62 expands, rotates the lever 66 clockwise about the pivot at its upper end, and causes displacement of the servomotor 42 to the right, that is to say, in a direction to either open the throttle valve 152, or to close the waste gate 148, so as to increase the engine induction pressure.

In the above described arrangements the regulator 60 automatically controls the engine induction pressure or density, and in turn any engine operative condition which is a function thereof, such as the engine air charge or the engine supply of combustible mixture, in dependence upon the setting of control member 80 and, if so desired, also in dependence upon the altitude and the temperature of bellows 62. Moreover, according to the invention, the regulator 60 may be used for the automatic regulation of an operative condition dependent for example on the engine manifold pressure, or fuel mixture supply. To that end, the regulator may generally include a device responsive to variations of the operative condition, as stated, which it is desired to regulate automatically. Such a device is operatively connected with the servo motor of the regulator for actuating the latter to vary the engine supply of combustible mixture (for instance by operating the throttle valve) with changes of said operative condition. Resilient means may be provided to oppose the servo motor actuating movement of said device, together with a manually operable control member for varying the amount of opposition exerted by said resilient means.

While specific mechanical embodiments have been illustrated for the purpose of disclosing the invention, it is to be understood that the invention is not limited to the arrangements so illustrated and described, but that such changes in the arrangement of the various parts and in the number, character and combination of the condition responsive means operatively connected therewith and in the manner of operation thereof may be resorted to as come within the scope of the appended claims.

In interpreting these claims, where they are directed to less than all of the elements of the complete system disclosed, they are to be construed as covering possible uses of the recited elements in installations which may lack the non-recited elements.

Certain features claimed herein are disclosed in my Patent No. 2,403,398, issued July 2, 1946.

What I claim is:

1. In combination with an internal combustion engine, a supercharger to supply a compressible medium thereto, a motor to drive said supercharger at variable speed, means for adjusting the speed of said supercharger, control means, means responsive to the pressure of said medium and to the surrounding atmospheric pressure, said first, second and third mentioned means being operatively interconnected to maintain for each adjustment of said control means and a given value of the surrounding atmospheric pressure a corresponding value of the pressure of said medium, the latter pressure decreasing in a predetermined way with a decrease of the surrounding atmospheric pressure whereby the power output of said engine, at a given speed thereof, depends on the adjustment of said control means and is substantially independent of changes of the surrounding atmospheric pressure owing to the simultaneous compensating variations of the pressure of said medium supplied to said engine and of the exhaust counter-pressure; a governor, means for driving the governor at speed equal or proportional to that of the supercharger, and a connection between the governor and the supercharger speed adjusting means, which connection becomes effective at preselected supercharger speed to provide speed regulation of the supercharger by the governor independently of the pressure responsive means.

2. In combination, an engine, a supercharger, a conduit connecting the discharge side of the supercharger to the engine intake, a cooler in said conduit, valve means regulating the flow through said cooler, a conduit for supplying air to the supercharger, valve means for regulating the temperature of the air supplied therethrough to the supercharger, and means responsive to the temperature of the cooled air discharged from the cooler for operating said two valve means in sequence.

3. In combination, an engine, a supercharger, a conduit connecting the discharge side of the supercharger to the engine intake, a cooler in said conduit, valve means regulating the flow through said cooler, a conduit for supplying air to the supercharger, valve means for regulating the temperature of the air supplied therethrough to the supercharger, means responsive to the temperature of the cooled air discharged from the cooler, and means for connecting said temperature responsive means to said first named valve means to effect positioning of it or to both said first named valve means and said second named valve means to effect their sequential positioning.

4. In combination with an engine having a supercharger and controllable air cooler means, means responsive to the manifold air temperature downstream from said supercharger for adjusting said cooler means to keep said temperature substantially constant irrespective of the supercharger speed, throttle means, control means, means responsive to the surrounding air pressure and temperature and to the manifold air pressure, and an operative connection between said three last mentioned means for actuating said throttle means to keep said manifold air at a pressure and thereby at a density varying substantially as a preselected function of the surrounding air pressure and temperature and of the adjustment of said control means independently of the supercharger speed.

5. An aircraft engine throttle control device including coaxial expansible pressure responsive means for actuating said throttle automatically upon either increase or decrease of atmospheric pressure and engine induction pressure, and a manually actuated lever to control engine operation, said lever being connected with said pressure responsive means to alter the operative adjustment of said pressure responsive means.

6. For use with an engine having a throttle and a manual throttle lever to control the engine, a throttle control device including a servo motor for actuating said throttle in either direction, servo motor control means, a lever having one end connected to said control means, coaxial expansible pressure responsive means connected with an intermediate point of said lever to actuate said control means upon changes of atmospheric pressure and engine induction pressure, and means to connect the opposite end of said lever with said manual throttle lever to alter the operative adjustment of said pressure responsive means with changes in the setting of said manual throttle lever.

7. For use with an aircraft engine having a throttle valve, a supercharger driven at variable speed and means for changing the supercharger speed, a control device including coaxial expansible pressure responsive means for actuating said throttle upon either increase or decrease of atmospheric pressure and engine induction pressure and operating on said first mentioned means to prevent increase of supercharger speed unless said throttle valve has reached a predetermined open position, and means actuatable from a manual control element to alter the operative adjustment of said pressure responsive means.

8. In combination with an engine having throttle means, pressure and temperature responsive means connected with said throttle means to actuate the latter in response to variations of engine manifold air pressure and atmospheric pressure and temperature, and manual control means for altering the operative adjustment of said responsive means.

9. Apparatus for controlling the pressure of the air supplied to the intake manifold of an internal combustion engine having a single manual lever to control the engine, a throttle, a compressor for supplying air to said intake manifold, and means for controlling the compression ratio of said compressor, comprising in combination, motor means for operating said throttle and said ratio controlling means, a control device responsive to the pressure in said intake manifold, means connecting the control device with the manual lever to vary the operative adjustment of said device upon changes in the setting of said lever, means including said control device for controlling said throttle, and means operated as an incident to movement of said throttle to its open position to place said ratio controlling means under control of said device.

10. In combination, an engine having at least one combustion chamber, a compressor, conduit means connecting the discharge side of the compressor to the combustion chamber, a cooler in said conduit means, first control means for regulating the effectiveness of the cooler, duct means for supplying air to the compressor, second control means for regulating the temperature of the air supplied through said duct means to the compressor, and temperature responsive means for operating said first and second control means in sequence.

11. For an engine having a carburetor, a supercharger between carburetor and engine, an auxiliary stage supercharger upstream with respect to the carburetor, and a throttling valve on the intake side of said auxiliary stage supercharger: a carburetor inlet air pressure regulator including an oil actuated servo piston for operating on said throttling valve; pressure responsive means including an evacuated bellows; a second bellows connected with the evacuated bellows; walls defining a conduit through which the space within the second bellows may be vented to carburetor inlet air pressure; a valve balanced as to oil pressure, said valve being connected with said pressure responsive means to be operated thereby; resilient means associated with said pressure responsive means; and setting means for varying the load of said resilient means during operation to alter the carburetor inlet air pressure, whereby the regulator may prevent said carburetor inlet air pressure from either exceeding or dropping below the valve corresponding to the adjustment of the setting means.

12. An engine having an air induction system; a variable speed supercharger connected with said system; supercharger speed control means; pressure responsive means connected with said induction system; reversible motor means controlled by said pressure responsive means and actuating said supercharger speed control means; a manual engine speed control lever; an operative connection between said engine speed control lever and said pressure responsive means for altering the setting of the latter with changes of adjustment of said lever; and a governing device responsive to supercharger speed, which device becomes effective at predetermined supercharger speed to override the pressure responsive means and actuate the supercharger speed control means.

13. For use with an engine having an air induction system, a variable speed supercharger therein, supercharger speed control means and a manual lever whereby the engine speed may be controlled: a supercharger control including reversible motor means for actuating the supercharger speed control means; pressure responsive means connected with said induction system between supercharger and engine for controlling said motor means; an operative connection for varying the pressure setting of the supercharger control with changes of adjustment of the manual lever; and a governing device responsive to supercharger speed and becoming effective at predetermined supercharger speed to control the motor means independently of the pressure responsive means.

14. For use with an engine having an air induction system, a second-stage supercharger driven from the engine, a variable speed first-stage supercharger, speed control means for the latter, and a throttle valve in said induction system: a control device including motor means for actuating the supercharger speed control means and the throttle valve; pressure responsive means connected with the air induction system for controlling the motor means; and a governor responsive to the speed of the first-stage supercharger, said governor becoming effective at predetermined speed of the first-stage supercharger to regulate the speed of the latter independently of said pressure responsive means.

15. In combination: a engine having an air induction system; a variable speed supercharger and a throttle valve associated with said system; supercharger speed control means; a control device including pressure responsive means connected with said induction system for controlling the supercharger speed control means and throttle valve; a manual lever for controlling the engine speed; and an operative connection for varying the pressure setting of said control device in accordance with the adjustment of the manual lever.

16. For an engine having an induction system including a first stage variable speed supercharger, a second stage engine driven supercharger, a throttle valve, and speed control means for the first stage supercharger: a control device having pressure responsive means connected to the induction system between second stage supercharger and engine for actuating said throttle valve and speed control means.

17. An engine having an induction system; a variable speed supercharger associated with said system; supercharger speed control means; an induction pressure control device including pressure responsive means connected with said induction system for actuating said supercharger speed control means; a control lever manually operable to regulate the engine speed; means for automatically varying the pressure setting of the induction pressure control device in accordance with the setting of said control lever; and a governing device including means responsive to supercharger speed, which device becomes effective at predetermined supercharger speed to control the supercharger speed control means independently of said pressure responsive means.

18. For an engine having a variable speed supercharger, supercharger speed control means and a control lever manually operable to regulate the engine speed and load: an engine manifold pressure regulator including servo motor means for actuating said supercharger speed control means; manifold pressure responsive means controlling said servo motor means; and adjusting means adapted for connection with said control lever to be actuated thereby for varying the operative setting of said pressure responsive means in accordance with the setting of the control lever.

19. For an engine having a throttle valve and a single control lever manually operable to regulate both the engine speed and load: a manifold pressure regulator including servo motor means for actuating said throttle valve automatically; engine manifold pressure and atmospheric pressure responsive means for controlling said servo motor means; and means adapted for connection with said control lever and to be actuated thereby for varying the pressure setting of the manifold pressure regulator.

20. In combination with an engine, first adjustable valve means for varying an engine operating temperature, second adjustable valve means for varying an engine operating temperature, and common temperature responsive means to operate said first and second valve means in sequence, 21. In an air intake system for an engine having a compressor and a heat exchanger: an inlet for cold air; an inlet for hot air; first valve means controlling said inlets; second valve means controlling the heat exchanger; and a control device connected with said first and second valve means to effect sequential operation thereof.

22. In an air intake system for a combustion engine, a cold air inlet; an alternate air inlet; a heat exchanger; and means to control said two inlets and heat exchanger in predetermined time relation.

23. A cold air inlet and an alternate air inlet for an engine; valve means operative to close one of said inlets and open the other simultaneously; heat exchanger means; and a control device including said valve means to control said inlets and heat exchanger means in predetermined sequence.

24. A system of control for supercharged engines comprising a throttle valve, a supercharger, means for driving the supercharger, means for varying the speed of the supercharger driving means, a servo motor adapted to operate the speed varying means, means under the control of engine intake pressure for controlling the servo motor, speed responsive means to maintain the speed of the supercharger at least at a predetermined minimum, means for regulating the throttle valve in response to intake pressure for so positioning the valve that a selected pressure will be maintained with minimum speed operation of the supercharger until the altitude requiring wide open throttle is exceeded, means operative upon wide opening of the throttle for rendering the servo motor effective to increase supercharger speed above the minimum as the altitude increases above the altitude requiring wide open throttle whereby a selected pressure is maintained during flight in a higher altitude range, and means for selecting the pressure to be maintained by operation of the throttle valve regulator and by operation of the means for varying the speed of the supercharger driving means.

25. A system of control for supercharged engines including a throttle valve, a supercharger, means for driving the supercharger, means for varying the speed of the supercharger driving means, and manual control means for selecting the pressure to be maintained in the engine air induction system by operation of the throttle valve and speed varying means, comprising: pressure responsive means; an operative connection between manual control means and pressure responsive means; conduit means to connect the pressure responsive means to the engine air induction system; pressure-controlled reversible motor means for so positioning the throttle valve that a selected pressure will be maintained with minimum speed operation of the supercharger until the altitude requiring substantially wide open throttle is attained; and means becoming operative as a result of the throttle valve reaching substantially wide open position to increase supercharger speed above the minimum to maintain the selected pressure upon further increase in altitude.

26. In an aircraft supercharger system: the combination with a supercharger of a mixing duct in air flow communication with the supercharger; a first pipe for conveying air from the mixing duct to the place of utilization; a second pipe for conveying air from the mixing duct to the place of utilization; said first and second pipes being both inserted downstream with respect to said supercharger; a heat exchanger in one of said pipes; valve means for apportioning flow of air through said two pipes to the place of utilization; a first conduit for supplying hot air to the mixing duct; a second conduit for supplying cold air to the mixing duct; valve means for controlling said conduits; additional valve means in said system; and air pressure and air temperature responsive means for actuating all of said valve means automatically.

27. Supercharged engine manifold air temperature and pressure regulating system including: a controllable intercooler on the discharge side of the supercharger for controlling the manifold air temperature; engine induction air temperature responsive means subjected to induction temperature downstream with respect to both the supercharger and the intercooler for controlling the intercooler; valve means for controlling the manifold air pressure, and temperature responsive means and induction pressure responsive means for operating the valve means.

28. For an engine having a gear-driven second-stage supercharger, a throttle valve, a first-stage supercharger, means for driving the first-stage supercharger at variable speed, and speed regulating means for the first-stage supercharger, an automatic manifold pressure regulator system including pressure responsive means; reversible motor means controlled by the pressure responsive means to actuate said throttle and supercharger speed regulating means; conduits to connect the pressure responsive means with the engine air induction system; said regulator system operating to increase the engine manifold air pressure by first opening the throttle valve until the valve is substantially wide open, and thereafter, as a result of said valve reaching such a position, by actuating the supercharger speed regulating means in a direction to increase the supercharger speed; and a single manually actuated lever through which the operative setting of the regulator system may be varied to select the engine manifold air pressure, whereby said pressure may be controlled by means of said single lever not only in the range below the second-stage critical altitude of the engine but also up to the limits of the first-stage supercharger.

29. For use with an engine having a variable speed supercharger, speed control means for the latter, and a throttle valve, an engine manifold pressure control device including pressure and temperature responsive means for operating said speed control means and throttle valve automatically, and means for altering the pressure setting of the control device.

30. An integrated control system for an aircraft engine having a throttle valve, a main stage supercharger, an auxiliary stage supercharger, first means to control the auxiliary stage supercharger, and a single manual lever for engine control; said system including: servomotor means so connected with said valve and first means as to control the same in preselected sequence dependent upon variations of barometric pressure; pressure responsive means controlling the servomotor means; conduit means for subjecting the pressure responsive means to an engine induction air pressure; and means for operatively connecting said single manual lever with the pressure responsive means whereby various values of engine manifold air pressure may be obtained by properly setting said single manual lever, said values being automatically maintained by said system not only in the range below the main stage critical altitude of the engine but also up to the limits of the auxiliary stage supercharger.

31. For use with an engine having a throttle, a supercharger whose pressure and temperature ratios may assume different operating values, conduit means connecting the discharge of the supercharger to the engine cylinders, and a controllable intercooler associated with said conduit means: a device for variably controlling the density and in turn the weight of air admitted to the engine cylinders per engine cycle irrespective of changes in the supercharger pressure and temperature ratios; said device including: temperature responsive means adapted for connection with said conduit means to be subjected to the temperature of the fluid in said conduit means downstream with respect to both supercharger and intercooler; intercooler control means actuated by said temperature responsive means to control the temperature of the fluid delivered to the engine cylinders irrespective of variations in the supercharger temperature ratio; throttle control means; manually actuated engine control means; and means responsive to the surrounding pressure and temperature and to the fluid pressure in said conduit means downstream with respect to the supercharger and variably adjustable in their operation from said engine control means for actuating the throttle control means to regulate the weight of air supplied to the engine cylinders as a preselected function of the surrounding pressure and temperature and the setting of said manually actuated engine control means.

32. In an air induction system for combustion engine: first and second control means regulating the engine induction air temperature; third and fourth control means regulating the engine induction air pressure; automatic means controlled by temperature responsive means to actuate said first and second control means in preselected sequence; and automatic means controlled by pressure responsive means to actuate said third and fourth control means in preselected sequence.

33. For an engine having a manual lever to control engine operation, a throttle valve, a control device including pressure responsive means operating on the throttle valve, a supercharger, means for driving the supercharger at variable speed, and an operative connection to vary the pressure setting of the device in accordance with the adjustment of said lever: supercharger speed regulating means which may become effective to increase the speed of the supercharger as a result of motion of said pressure responsive means in a direction to open the throttle valve, and to decrease the speed of the supercharger as a result of motion of the pressure responsive means in the direction to close the throttle valve.

34. For an engine having an induction system, a throttle and a supercharger in said induction system, means for driving the supercharger at variable speed, and supercharger speed regulating means, a control device including: pressure responsive means; conduit means connecting the pressure responsive means with the induction system; and an operative connection actuating the supercharger speed regulating means from said pressure responsive means, which connection becomes effective to increase the supercharger speed only upon attainment by the throttle of practically wide open position.

35. For use with an engine having an induction system, a throttle valve in said system, a supercharger, means for driving the supercharger at variable speed, and supercharger speed regulating means, a control device including first means operating on said throttle valve, second means operating on the supercharger speed regulating means, pressure responsive means, conduit means for connecting said pressure responsive means with the induction system, and an operative connection including servomotor means for actuating said first and second means from the pressure responsive means, the operative connection between the pressure responsive means and the second means becoming effective to variably regulate the supercharger speed only when the throttle valve has attained a predetermined open position.

36. For use with an engine having an induction system, a throttle therein, a supercharger connected with the induction system, means for driving the supercharger at variable speed, and supercharger speed control means, a control device including: pressure responsive means; conduit means for connecting the pressure responsive means to the induction system; servomotor means controlled by the pressure responsive means and adapted to operate on said supercharger speed control means, said servomotor means becoming effective variably to regulate the supercharger speed when the throttle is in predetermined open position; and speed responsive governing means driven at speed equal or proportional to that of the supercharger, said governing means becoming effective at predetermined supercharger speed to override the action of said servomotor means upon the supercharger speed control means and take over control of the supercharger speed.

37. For use with an engine having a manifold, a throttle, a supercharger, means for driving the supercharger at variable speed, and supercharger speed control means, an automatic engine control including: pressure responsive means; conduit means through which the pressure responsive means may be subjected to manifold pressure; first connecting means including servomotor means through which the throttle may be actuated as a result of motion of the pressure responsive means caused by variations of manifold pressure; additional means including resilient means through which the supercharger speed control means may be actuated as a result of motion of said pressure responsive means caused by variations of manifold pressure; said resilient means so operating upon said additional means as to prevent actuation of the supercharger speed control means in a direction to increase the supercharger speed as long as the throttle is open less than a predetermined amount, while permitting operation of said supercharger speed control means variably to regulate the supercharger speed as a result of motion of said pressure responsive means when the throttle is in predetermined open position.

38. For use with an engine having a manual control lever, an air induction system, a throttle, a supercharger, means for driving the supercharger at variable speed, and supercharger speed control means, a control device including: servomotor means actuating the throttle; pressure responsive means controlling the servomotor means; conduit means connecting the pressure responsive means with the induction system; additional means including resilient means through which the supercharger speed control means may be actuated as a result of motion of the servomotor means and throttle; said resilient means operating to prevent actuation of said supercharger speed control means in a direction to increase the supercharger speed as long as the throttle is open less than a predetermined amount, while permitting actuation of said speed control means variably to regulate the supercharger speed when the throttle is in predetermined substantially open position; and means for connecting the manual control lever with the control device to alter the pressure setting of said device.

39. For an engine having a throttle, a supercharger, means for driving the supercharger at variable speed, a servomotor actuating the throttle, and induction pressure responsive means controlling the servomotor, a supercharger regulating device including supercharger speed control means; an operative connection including resilient means for actuating said supercharger speed control means as a result of motion of said servomotor in a direction to increase the speed of the supercharger upon motion of the servomotor in a direction tending to open the throttle, and in a direction to decrease the speed of the supercharger upon motion of the servomotor tending to close the throttle; said resilient means operating to render said operative connection ineffective and thereby prevent any increase of supercharger speed whenever the throttle is open less than a predetermined amount.

40. For use with an engine having a throttle, a variable speed supercharger, and a manually actuated control lever, a control device including: servomotor means for actuating the throttle in either direction and increasing or decreasing the supercharger speed; servomotor control means; a floating lever connected at a first point to said servomotor control means; pressure responsive means; passage means through which the pressure responsive means may be subjected to and actuated by variations of manifold pressure and altitude pressure; said pressure responsive means including coaxial bellows connected with a second point of the floating lever; and a connection between a third point of the floating lever and the manually actuated control lever.

41. For an engine having engine air consumption regulating means, a control device including: pressure and temperature responsive means operatively connected to said regulating means to actuate the same upon variations of engine induction air pressure and surrounding air pressure and temperature; and manually actuated control means operatively connected with said responsive means to alter the operative setting of the control device.

42. For an engine having a supercharger, means for driving the supercharger at variable speed, and supercharger speed regulating means, a control device including: pressure and temperature responsive means operatively connected to said regulating means to actuate the same upon variations of engine manifold pressure, altitude pressure and surrounding air temperature; and manually actuated control means operatively connected with said responsive means to alter the operative setting of the control device.

43. For a combustion engine having engine air supply control means, a regulating device including pressure and temperature responsive means adapted to be subjected to and operated by variations of engine induction air pressure, altitude pressure and atmospheric temperature; and an operative connection between the pressure and temperature responsive means and the air supply control means to regulate the engine air supply in predetermined relation to said pressures and temperature.

44. For use with an engine having a throttle, a supercharger, means for driving the supercharger at variable speed, supercharger speed control means, a manual control for selecting the pressure to be maintained in the engine manifold by operation of the throttle and supercharger speed control means, pressure responsive means, a connection between the manual control and the pressure responsive means, conduit means connecting the pressure responsive means to the engine manifold, and servomotor means under the control of the pressure responsive means for so positioning the throttle that a selected manifold pressure will be maintained with minimum speed operation of the supercharger until the altitude requiring substantially wide open throttle is attained, a control device for the supercharger including means operatively connected with the supercharger speed control means and becoming operative as a result of the throttle valve reaching substantially wide open position for actuating said supercharger speed control means and so increase the supercharger speed above the minimum as to maintain the selected manifold pressure upon further increase of altitude.

45. For use with an engine having a throttle, a variable speed supercharger, supercharger speed control means, a manually actuated control for selecting the pressure to be maintained in the engine manifold by operation of the throttle and supercharger speed control means, pressure responsive means connected with the engine manifold, and reversible motor means under the control of the pressure responsive means for so positioning the throttle that a selected pressure will be maintained in the manifold with minimum speed of the supercharger until the altitude requiring substantially wide open throttle is attained, a control mechanism for the supercharger including means operatively connected with the supercharger speed control means and becoming operative as a result of the throttle valve reaching predetermined substantially wide open position for actuating said speed control means so as to increase the supercharger speed above the minimum in order to maintain the selected manifold pressure upon further increase of altitude, and governing means driven at speed equal to or proportional to the speed of the supercharger for taking over control of the supercharger speed control means when a predetermined value of said speed is attained.

46. For an air consuming powerplant having an air intake system; a control device including air flow regulating means, pressure responsive means adapted to sense variations of pressure in said air intake system, barometric pressure and ambient temperature responsive means, a control member movable from a low power output position to a full power position, and an operative connection actuating said air flow regulating means from said pressure responsive means, said pressure and temperature responsive means and said control member.

47. A control device for a combustion engine having an air intake system and an air compressor therein; said control device including regulating means operating to control the speed of the compressor, first pressure responsive means adapted for connection with the engine air intake system to sense pressure variations therein, barometric pressure and surrounding temperature responsive means, and an operative connection actuating said regulating means from said first pressure responsive means and said barometric pressure and temperature responsive means.

48. A control device for a combustion engine having an air intake system and an air compressor therein; said control device including regulating means operating to control the compressor speed, first pressure responsive means adapted for connection with the engine to be actuated upon pressure variations in said intake system, surrounding pressure and temperature responsive means, a control member gradually movable from a low power position to a full power position, and an operative connection between said first pressure responsive means, said surrounding pressure and temperature responsive means, said control member and said regulating means.

49. In a control for a combustion engine having an air intake system, in combination, regulating means movable to increase or decrease engine power, a control member movable from a low power position through intermediate power adjustments to a full power position, first pressure responsive means adapted for connection with said intake system, barometric pressure and atmospheric temperature responsive means, and an operative connection between said regulating means, said control member, said first pressure responsive means and said barometric pressure and atmospheric temperature responsive means for actuating said regulating means.

50. In an engine throttle control device, in combination, regulating means for positioning an engine throttle, first pressure responsive means adapted for connection to a portion of an engine to sense variations of a pressure therein dependent upon the setting of said throttle, barometric pressure responsive means, atmospheric temperature responsive means, a control member movable from a low power position to a full engine power position, and means operatively connecting said control member, first pressure responsive means, barometric pressure responsive means and atmospheric temperature responsive means to said regulating means for positioning the throttle automatically.

51. Control device for an engine having an air induction system, a variable speed supercharger and a throttle valve associated with said system, supercharger speed regulating means, and a control member movable from a low engine power position through a range of intermediate power values to a full power position; said control device including: pressure responsive means adapted for connection with the engine induction system for controlling the supercharger speed regulating means and the throttle valve, and an operative connection for varying the pressure setting of said control device in accordance with the adjustment of the control member.

52. Control device for an engine having an air induction system, a variable speed supercharger and a throttle valve associated with said system, supercharger speed regulating means, and a control member movable from a low engine power position through a range of intermediate power values to a high power position; said device including pressure responsive means adapted for connection with the engine induction system for controlling the supercharger speed regulating means and the throttle valve automatically to maintain a selected induction pressure, the arrangement being such that under operating conditions well within throttle valve capacity and such, therefore, as can be met with said supercharger substantially inoperative and with the throttle valve only partly open, the control device maintains the selected pressure by operating only upon said throttle valve while said supercharger revolves substantially at minimum speed; and an operative connection for varying the selected pressure to be maintained by said control device in accordance with changes in the adjustment of said control member.

53. For use with an engine having an air induction system, a variable speed supercharger and a throttle valve associated with said system, supercharger speed regulating means, a control member movable from a low engine power position through a range of intermediate power values to a high power position, pressure responsive means connected with the engine induction system for controlling the supercharger speed regulating means and the throttle valve automatically to maintain a selected induction pressure, and an operative connection for varying the selected pressure to be maintained by said pressure responsive means in accordance with changes in the adjustment of said control member; control apparatus for actuating said supercharger speed regulating means under supervision by said pressure responsive means, said apparatus operating to maintain said supercharger substantially inactive when the throttle valve is open only by a small amount.

FERDINANDO CARLO REGGIO.

REFERENCES CITED

The following references are of record in the file of this patent:

UNITED STATES PATENTS

| Number | Name | Date |
| --- | --- | --- |
| 764,572 | Fulton | July 12, 1904 |
| 1,371,444 | Sherbondy | Mar. 15, 1921 |
| 1,508,707 | Moss | Sept. 16, 1924 |
| 1,655,683 | Standerwick | Jan. 10, 1928 |
| 1,816,737 | Moss | July 28, 1931 |
| 1,816,787 | Moss | July 28, 1931 |
| 2,020,224 | Waseige | Nov. 5, 1935 |
| 2,082,397 | Hiscock | June 1, 1937 |
| 2,088,954 | Gregg | Aug. 3, 1937 |
| 2,148,230 | Berger | Feb. 21, 1939 |
| 2,187,737 | Gregory | Jan. 23, 1940 |
| 2,189,475 | Saur | Feb. 6, 1940 |
| 2,208,689 | Sulzman | July 23, 1940 |
| 2,216,699 | Berger | Oct. 1, 1940 |
| 2,217,364 | Halford et al. | Oct. 8, 1940 |
| 2,283,175 | Berger | May 19, 1942 |
| 2,284,687 | Schimanek | June 2, 1942 |
| 2,373,139 | Morris | Apr. 10, 1945 |
| 2,403,398 | Reggio | July 2, 1946 |
| 2,403,399 | Reggio | July 2, 1946 |

FOREIGN PATENTS

| Number | Country | Date |
| --- | --- | --- |
| 479,278 | Great Britain | Jan. 28, 1938 |